US011375122B2

(12) United States Patent
Timonen et al.

(10) Patent No.: US 11,375,122 B2
(45) Date of Patent: Jun. 28, 2022

(54) DIGITAL IMAGE CAPTURE SESSION AND METADATA ASSOCIATION

(71) Applicant: eBay Inc., San Jose, CA (US)

(72) Inventors: Joshua Reino Timonen, Oak Grove, OR (US); William Kirk Brohman, Portland, OR (US); Jonathan David Chard, Portland, OR (US); Erin Courtney Miller, Oregon City, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/246,662

(22) Filed: May 2, 2021

(65) Prior Publication Data

US 2021/0258502 A1   Aug. 19, 2021

Related U.S. Application Data

(63) Continuation of application No. 16/424,054, filed on May 28, 2019, now Pat. No. 11,025,827, which is a
(Continued)

(51) Int. Cl.
*G06T 5/00* (2006.01)
*H04N 5/232* (2006.01)
(Continued)

(52) U.S. Cl.
CPC ..... *H04N 5/232939* (2018.08); *G06F 3/0488* (2013.01); *G06F 16/58* (2019.01);
(Continued)

(58) Field of Classification Search
None
See application file for complete search history.

(56) References Cited

U.S. PATENT DOCUMENTS 6,804,652 B1   10/2004 Shaffer
8,639,580 B1 *  1/2014 Van Horn ............. G06Q 30/06
                                          705/26.2
(Continued)

FOREIGN PATENT DOCUMENTS

JP        2012-138750 A     7/2012
KR   10-2015-0135042 A    12/2015
(Continued)

OTHER PUBLICATIONS

Office Action received for Korean Patent Application No. 10-2020-7006887 dated Jan. 21, 2021, 8 pages (1 page of English Translation and 7 pages Official Copy).
(Continued)

*Primary Examiner* — Mark T Monk
(74) *Attorney, Agent, or Firm* — FIG. 1 Patents (57) ABSTRACT

Digital image capture session and metadata association techniques are described. In one example, a user input is received to initiate an image capture session. At least one digital image is captured using a digital camera during the image capture session. Audio input data is also collected using an audio input device during the image capture session and is converted into text data, e.g., speech-to-text. Metadata is generated based on the text data and associated with the at least one digital image. The at least one digital image is output as having the associated metadata as completion of the image capture session.

20 Claims, 10 Drawing Sheets

Related U.S. Application Data continuation of application No. 15/703,556, filed on Sep. 13, 2017, now Pat. No. 10,362,233.

(60) Provisional application No. 62/557,668, filed on Sep. 12, 2017.

(51) Int. Cl.

| | | |
|---|---|---|
| *G06T 11/60* | (2006.01) | |
| *G06F 3/0488* | (2022.01) | |
| *G06F 16/58* | (2019.01) | |
| *G06F 16/683* | (2019.01) | |
| *G10L 15/26* | (2006.01) | |
| *H04N 7/18* | (2006.01) | |
| *G06Q 30/06* | (2012.01) | |
| *G06F 16/51* | (2019.01) | |
| *G06F 16/951* | (2019.01) | |

(52) U.S. Cl.
CPC ............ *G06F 16/685* (2019.01); *G06T 11/60* (2013.01); *G10L 15/26* (2013.01); *H04N 5/232* (2013.01); *H04N 5/23293* (2013.01); *H04N 5/232933* (2018.08); *H04N 7/18* (2013.01); *G06F 16/51* (2019.01); *G06F 16/951* (2019.01); *G06Q 30/0623* (2013.01)

(56) References Cited

U.S. PATENT DOCUMENTS

| | | | |
|---|---|---|---|
| 9,407,860 B2 | 8/2016 | Barnes, Jr. | |
| 10,362,233 B2 | 7/2019 | Timonen et al. | |
| 11,025,827 B2* | 6/2021 | Timonen | H04N 7/18 |
| 2006/0028561 A1 | 2/2006 | Tsunoda | |
| 2007/0179861 A1 | 8/2007 | Woodfin | |
| 2012/0162251 A1 | 6/2012 | Minamino et al. | |
| 2012/0284105 A1* | 11/2012 | Li | G06Q 30/02 705/14.23 |
| 2013/0110678 A1 | 5/2013 | Vigier et al. | |
| 2013/0120594 A1 | 5/2013 | Krula | |
| 2013/0222671 A1 | 8/2013 | Tseng et al. | |
| 2013/0304611 A1* | 11/2013 | Shah | G06Q 30/06 705/26.61 |
| 2014/0218554 A1 | 8/2014 | Yang et al. | |
| 2015/0016675 A1 | 1/2015 | Kishi | |
| 2015/0199766 A1* | 7/2015 | Vilmont | G06Q 50/16 705/36 T |
| 2015/0220225 A1 | 8/2015 | Jiang et al. | |
| 2015/0339348 A1 | 11/2015 | Joo et al. | |
| 2015/0339391 A1* | 11/2015 | Kang | G06F 16/532 707/722 |
| 2015/0370444 A1 | 12/2015 | Jitkoff et al. | |
| 2016/0142879 A1 | 5/2016 | Walden et al. | |
| 2016/0188652 A1 | 6/2016 | Goo et al. | |
| 2016/0321709 A1 | 11/2016 | Reichert | |
| 2017/0124041 A1 | 5/2017 | Campbell et al. | |
| 2019/0080494 A1 | 3/2019 | Timonen et al. | |
| 2019/0281228 A1 | 9/2019 | Timonen et al. | |

FOREIGN PATENT DOCUMENTS

| | | |
|---|---|---|
| KR | 1020160028977 | 3/2016 |
| WO | 2019/055356 A1 | 3/2019 |

OTHER PUBLICATIONS

Notice of Allowance received for U.S. Appl. No. 15/703,556, dated Mar. 4, 2019, 13 pages.
Corrected Notice of Allowability Received for U.S. Appl. No. 16/424,054, dated Feb. 22, 2021, 3 Pages.
Final Office Action Received for U.S. Appl. No. 16/424,054, dated Mar. 17, 2020, 25 pages.
Final Office Action Received for U.S. Appl. No. 16/424,054, dated Nov. 24, 2020, 31 pages.
Non Final Office Action Received for U.S. Appl. No. 16/424,054, dated Jun. 5, 2020, 35 Pages.
Non-Final Office Action Received for U.S. Appl. No. 16/424,054, dated Oct. 10, 2019, 22 pages.
Notice of Allowance Received for U.S. Appl. No. 16/424,054, dated Jan. 27, 2021, 11 pages.
Notice Of Allowance received for U.S. Appl. No. 16/424,054, dated Jul. 12, 2019, 13 pages.
International Preliminary Report on Patentability received for PCT Application No. PCT/US2018/050304, dated Mar. 26, 2020, 9 pages.
International Search Report for PCT Application No. PCT/US2018/050304, dated Jan. 2, 2019, 6 pages.
International Written Opinion received for PCT Application No. PCT/US2018/050304, dated Jan. 2, 2019, 7 pages.
10-2021-7037129 , "Office Action received for Korean Patent Application No. 10-2021-7037129 dated Feb. 7, 2022", Feb. 7, 2022, 5 Pages.

* cited by examiner

DIGITAL IMAGE CAPTURE SESSION AND METADATA ASSOCIATION

RELATED APPLICATIONS

This application is a continuation of and claims priority to U.S. patent application Ser. No. 16/424,054, filed May 28, 2019, which claims priority under 35 U.S.C. § 120 to U.S. patent application Ser. No. 15/703,556, filed on Sep. 13, 2017, which claims priority to U.S. Provisional Application Ser. No. 62/557,668, filed on Sep. 12, 2017, the disclosures of which are incorporated by reference herein.

BACKGROUND

Mobile devices have become an integral part of a user's everyday life. A mobile phone, for instance, may be used to read emails, engage in social media, capture digital images, communicate via instant messages, and so forth. Likewise, wearable devices such as smart watches have continued to expand this interaction. Accordingly, users have access to a wide range of devices in a variety of usage scenarios.

However, configuration as a mobile device may introduce challenges and complexity in support of user interactions with these devices. A mobile phone or smart watch, for instance, may have a limited ability to support entry of text, navigate between files, and so on. Accordingly, user interaction with these devices may be limited and cause computational inefficiencies as a result.

SUMMARY

Digital image capture session and metadata association techniques are described. These techniques help overcome the conventional challenges of user interaction with computing devices, especially mobile devices, with increased computational efficiency over conventional techniques. In one example, a user input is received to initiate an image capture session. At least one digital image is captured using a digital camera during the image capture session. Audio input data is also collected during the image capture session using an audio input device and converted into text data, e.g., speech-to-text. Metadata is generated based on the text data and associated with the at least one digital image. The at least one digital image is output as having the associated metadata as completion of the image capture session.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 3A and 3B depict examples of user interaction with the digital image processing module as an image capture session.

DETAILED DESCRIPTION

Overview

Digital image capture session and metadata association techniques are described. These techniques help overcome the conventional challenges of user interaction with computing devices, especially mobile devices. This results in increased computational efficiency in operation of the computing device through increased accuracy in the user's interaction with the device as compared to conventional interaction that may require the user to repeat and modify inputs in order to achieve a desired action.

In one example, a computing device is configured to associate metadata with a digital image. A digital image processing module, for instance, may receive a user input to initiate a digital image capture session through selection of an option in a user interface. This causes the digital image processing module to call up a live view of the digital camera in a user interface output by a display device to initiate the image capture session.

During the session, a timing indicator is output in the user interface as part of the live view (i.e., real time output) to indicate a time at which a digital image is to be captured. The timing indicator, for instance, may be configured as a radial timer indicating passage of time as an expanding circle outward to a defined border. Therefore, once the expanding circle reaches the border, a digital image is captured by the digital camera. An animation is then employed to display a thumbnail of the digital image as moving to a defined portion (e.g., "dock") of the user interface. In this way, the digital image processing module may capture multiple digital images in sequence in an efficient and intuitive manner within a single image capture session.

During the image capture session, the digital image processing module is also configured to capture audio data via an audio input device, e.g., a microphone. The audio data is then used as a basis to generate metadata for association with the digital image. Thus, a user may hold a button to initiate the image capture session, capture multiple digital images, and associate metadata using voice or others sounds in an efficient and intuitive manner that overcomes input device challenges of mobile devices.

The association of the metadata with the digital image may support a variety of functionality. The audio data, for instance, may be converted to text using speech-to-text functionality. A user, for example, may identify content included in the digital image (e.g., "Eiffel Tower") and have that metadata associated with the digital image as a tag. In this way, the user may efficiently interact with the computing device to achieve this desired action.

In another example, text is used by the digital image processing module as part of a search to obtain the metadata as relating to the digital image. The text, for instance, may be communicated to a service provider system via a network (e.g., the Internet) to obtain the metadata to identify a particular product that is the subject of the digital image. The text is then used to obtain additional information about the product, which may then be displayed in the user interface proximal to the digital image, e.g., a collection of thumbnails as described above. The additional information, for example, may further identify the product (e.g., a name of the product), an average cost of the product as part of an online auction or other retail system, and so forth.

A user may then save the digital image and associated metadata in a "vault" on the computing device as a result of the image capture session, which may be automatically updated, e.g., for the average prices. This process may be repeated for additional products and services (which may be grouped into collections) and thus provides additional insight into potential revenue opportunities to sell the products, buy similar products, and so forth. Further discussion of these and other examples is included in the following sections and shown in corresponding figures.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
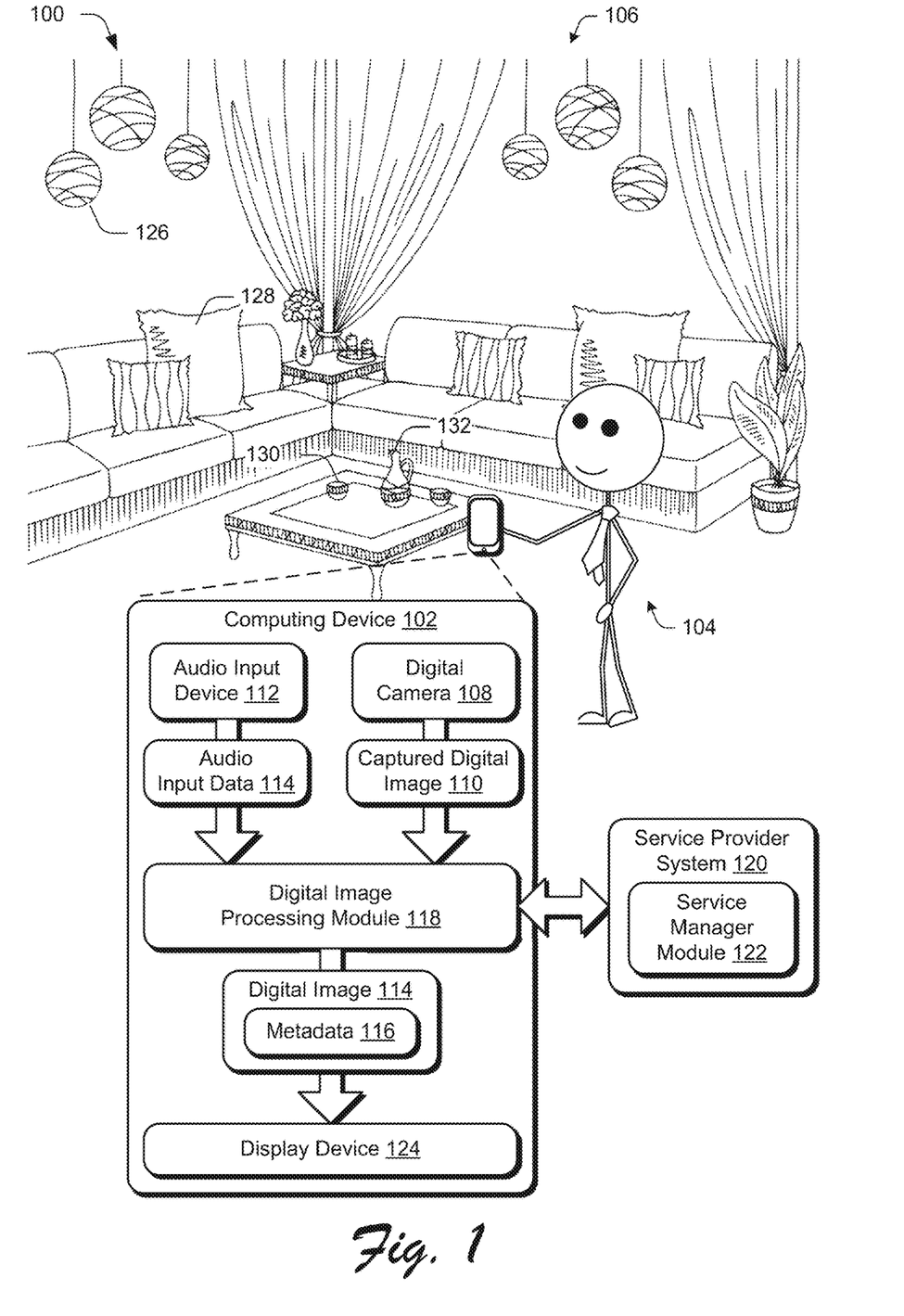
FIG. 1 is an illustration of an environment in an example implementation that is operable to employ digital image capture system techniques described herein.

FIG. 1 is an illustration of a digital medium environment 100 in an example implementation that is operable to employ digital image capture session techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as being held by a user 104 in a physical environment, e.g., a living room 106. The computing device 102 includes a digital camera 108 that is configured to capture digital images 110 of the living room 106, e.g., through use of a charge coupled device (CCD) sensor. The captured digital images 110 may then be stored as pixels in a computer-readable storage medium and/or rendered for display by a display device, e.g., LCD, OLED, LED, etc.

The computing device 102 also includes an audio input device 112 (e.g., a digital microphone) that is configured to capture audio input data 114. The audio input data 114, for instance, may include spoken utterances from the user 104, background noise, and so forth. The audio input data 114 is also storable by a computer-readable storage medium and/or rendered by an audio output device, e.g., speakers.

Both the audio input data 114 and the captured digital image 110 are provided to a digital image processing module 118. The digital image processing module 118 is implemented at least partially in hardware of the computing device 102 (e.g., processing system and computer readable storage medium) to associate metadata 116 with the digital image 114. The metadata 116, for instance, may be generated locally by the digital image processing module 118, itself, or in combination with a service provider system 120 and service manager module 122 that are accessible via a network, e.g., the Internet. The digital image 114 and metadata 116 are then output by the digital image processing module 118 for rendering by the display device 124.

As previously described, association of the metadata 116 with the digital image 114 may support a variety of functionality. The user 104, for instance, may be situated in the living room 106 surrounded by a variety of different physical objects, such as a lamp 126, pillow 128, cup 130, pitcher 132, and so on. Conventional techniques that are used to determine a value of the objects and sell the objects could be cumbersome and computationally inefficient.

Accordingly, the digital image processing module 118 is configured in this example to employ image capture sessions to capture digital images 110 of these objects. Audio input data 114 is also captured as part of the session that describes the objects, e.g., by brand name, category, and so on. The user, for instance, 104 may utter "Brand X Cup" 130, which is captured as audio input data 114 within the session. The audio input data 114 is then converted to text by the digital image processing module 118 and communicated to the service provider system 120 to obtain metadata 116 that describes the content (i.e., the cup 130) in the digital image 110. The metadata 116, for instance, may describe an average price for the cup based on past online auctions, brand names of the cup 130, stock images, and so on. The user 104 may then continue this process through a series of successive image capture sessions to learn about the pitcher 132, lamp 126, and so forth. In this way, the user 104 is given insight into the potential value and characteristics of the objects in an efficient and intuitive manner. Other uses of image capture sessions and associated functionality are also contemplated, such as for image tagging, form completion (e.g., insurance forms), searches, and so on.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Image Capture Session

Figure 2:
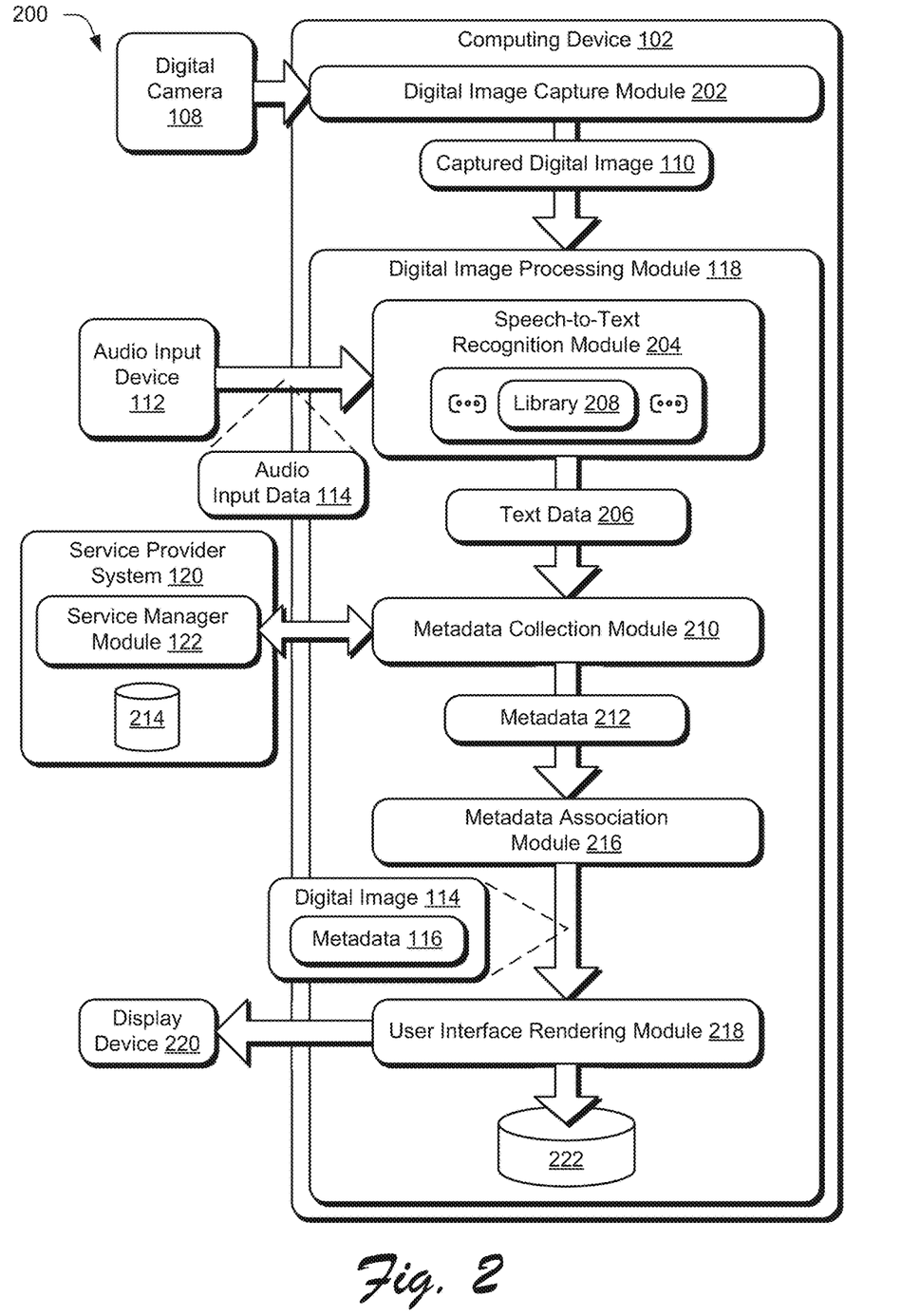
FIG. 2 depicts a system in an example implementation showing operation of a digital image processing module of FIG. 1 in greater detail.
Figure 3A:
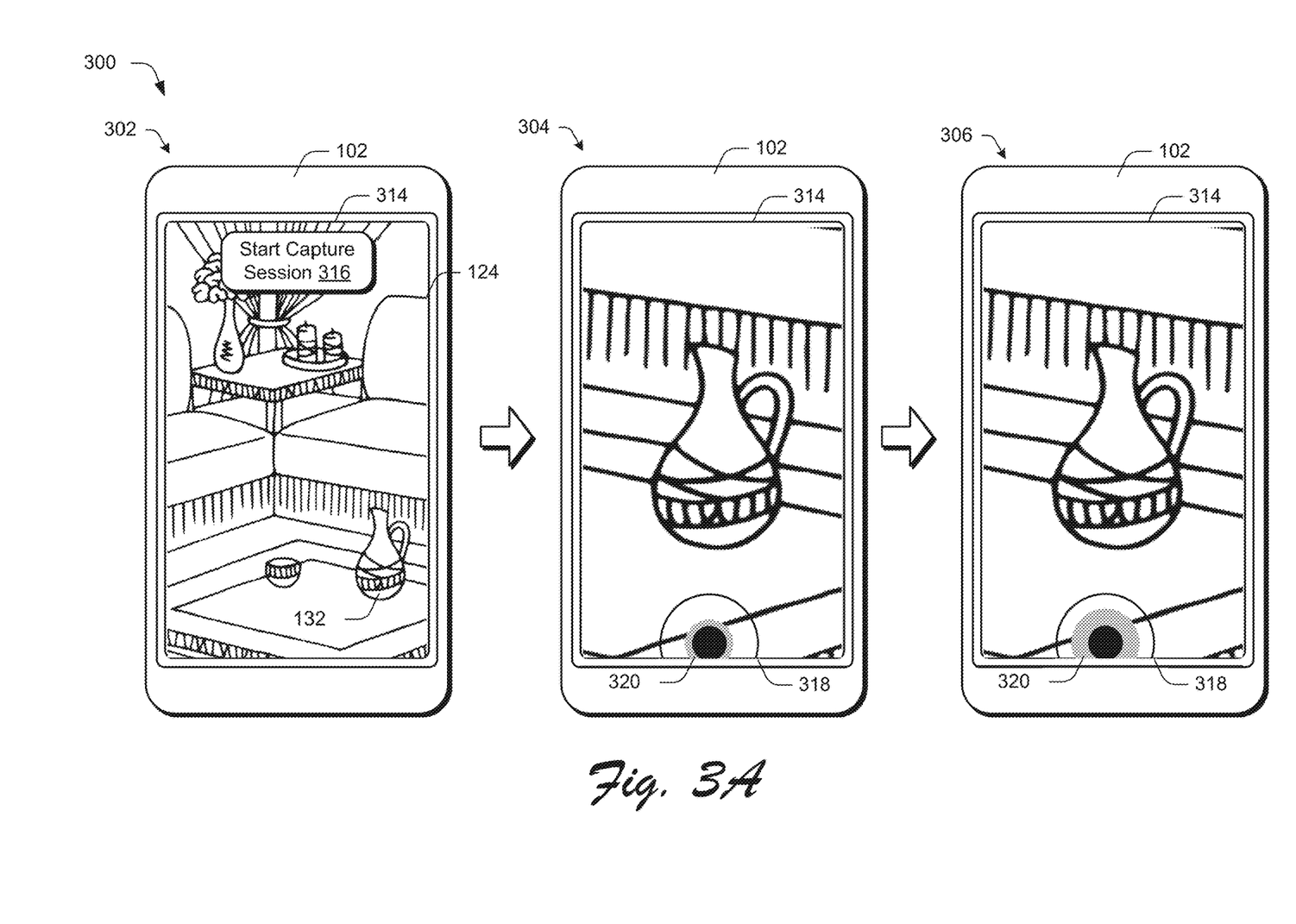
Figure 4:
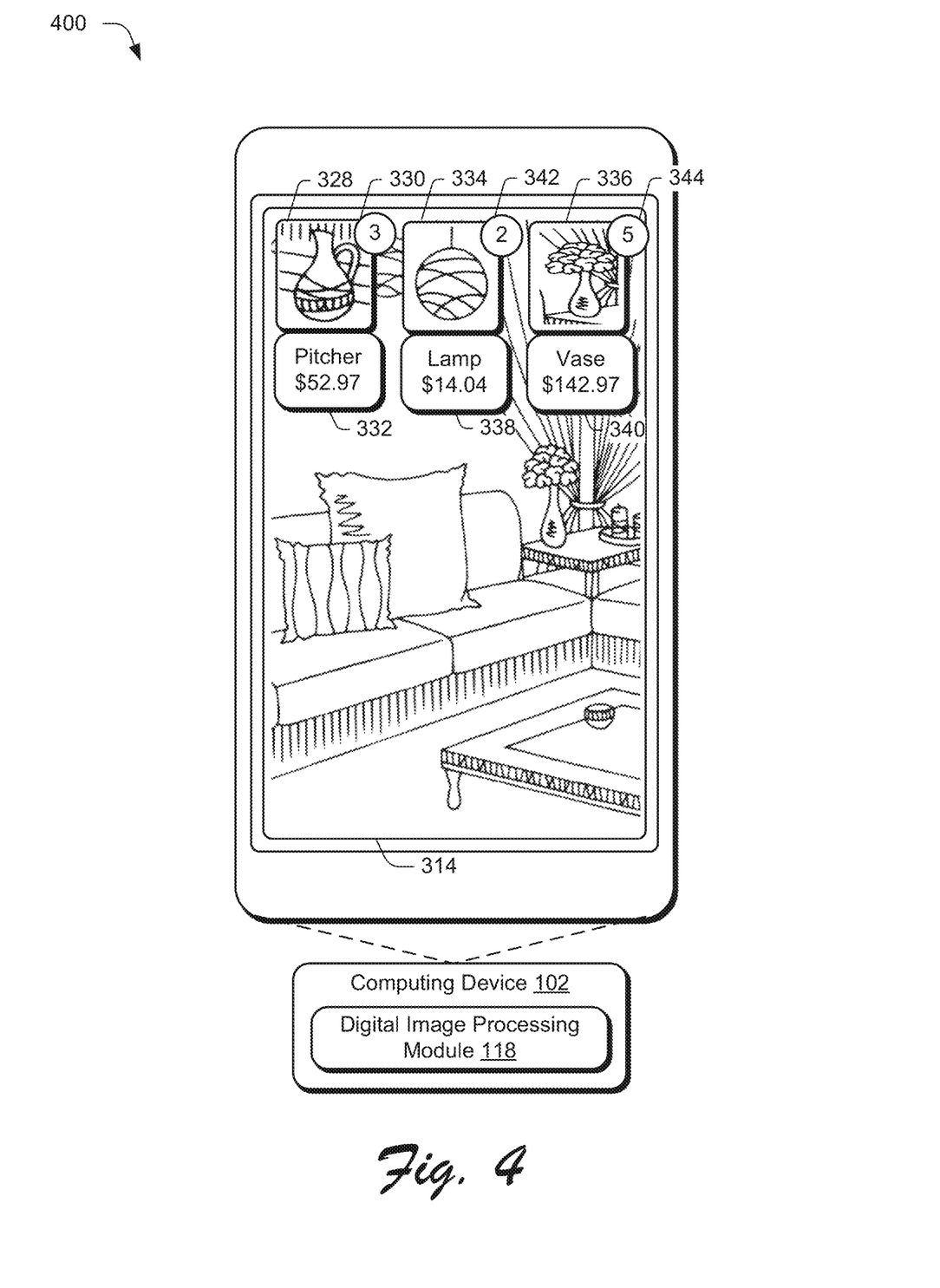
FIG. 4 depicts an example of the results of multiple digital image capture sessions.
Figure 5:
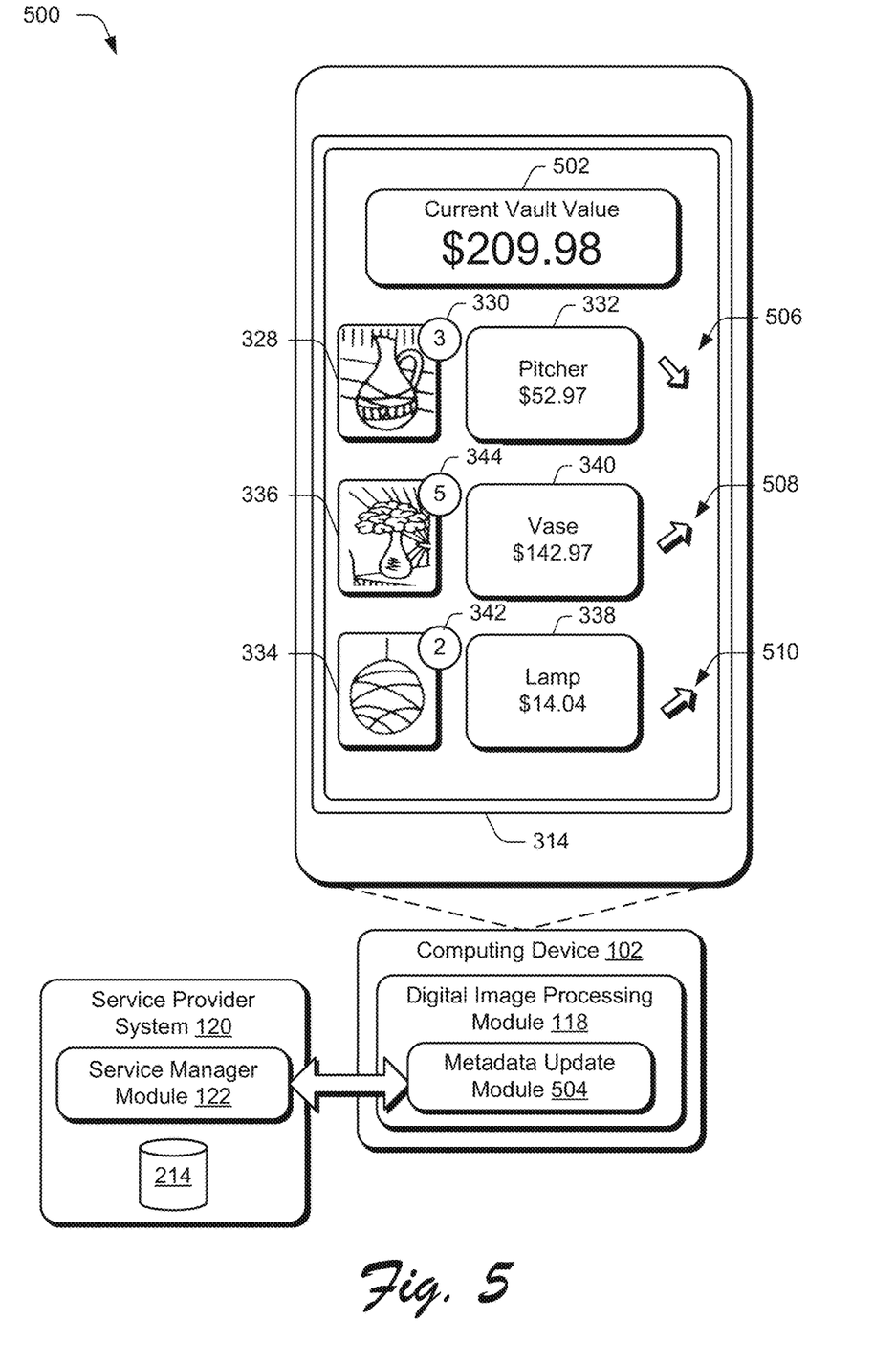
FIG. 5 depicts an example implementation of a virtual vault including results of multiple image capture sessions.
Figure 5B:
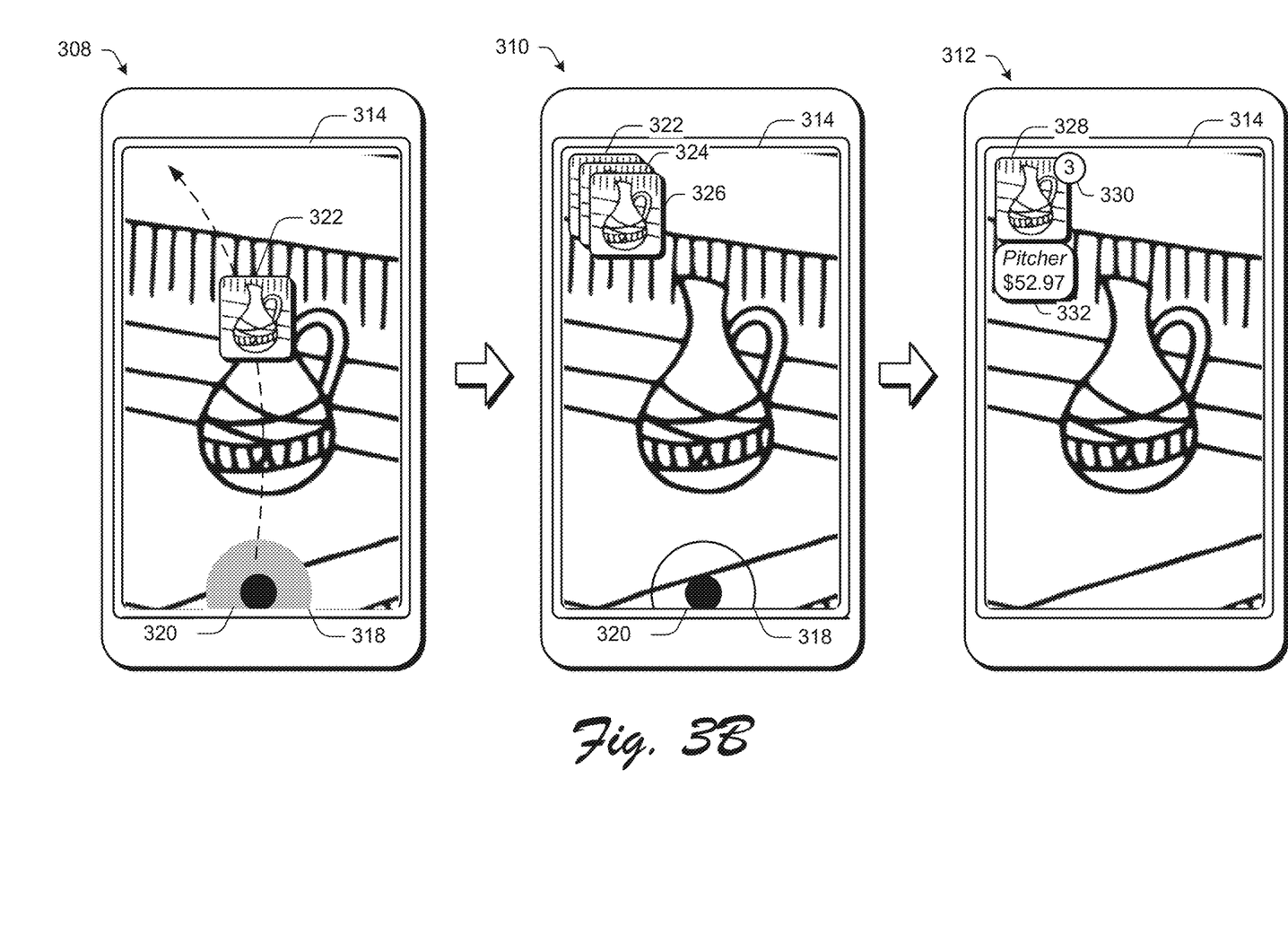
Figure 6:
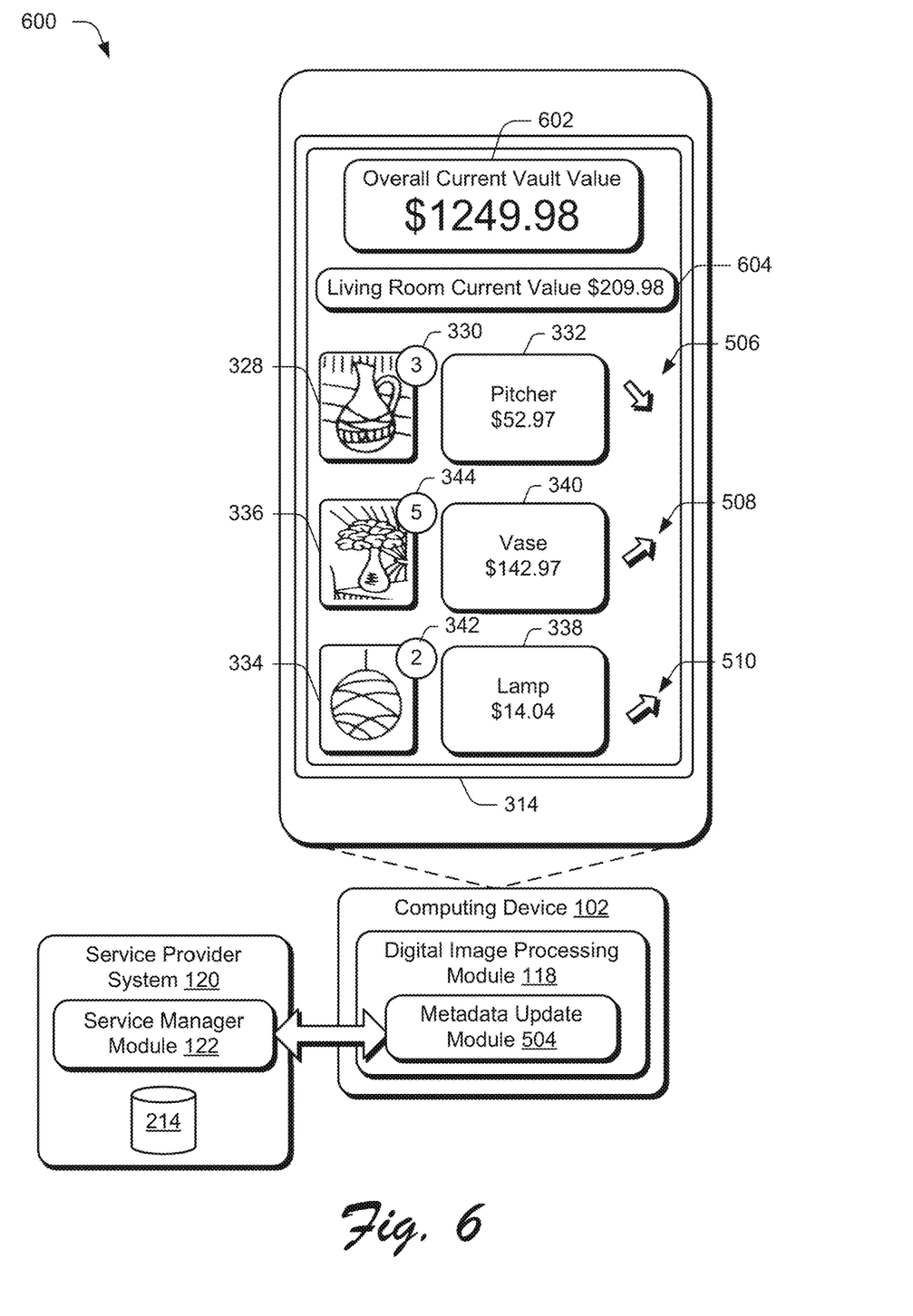
FIG. 6 also depicts implementation of a virtual vault including results of multiple image capture sessions as including user definable collections.
Figure 7:
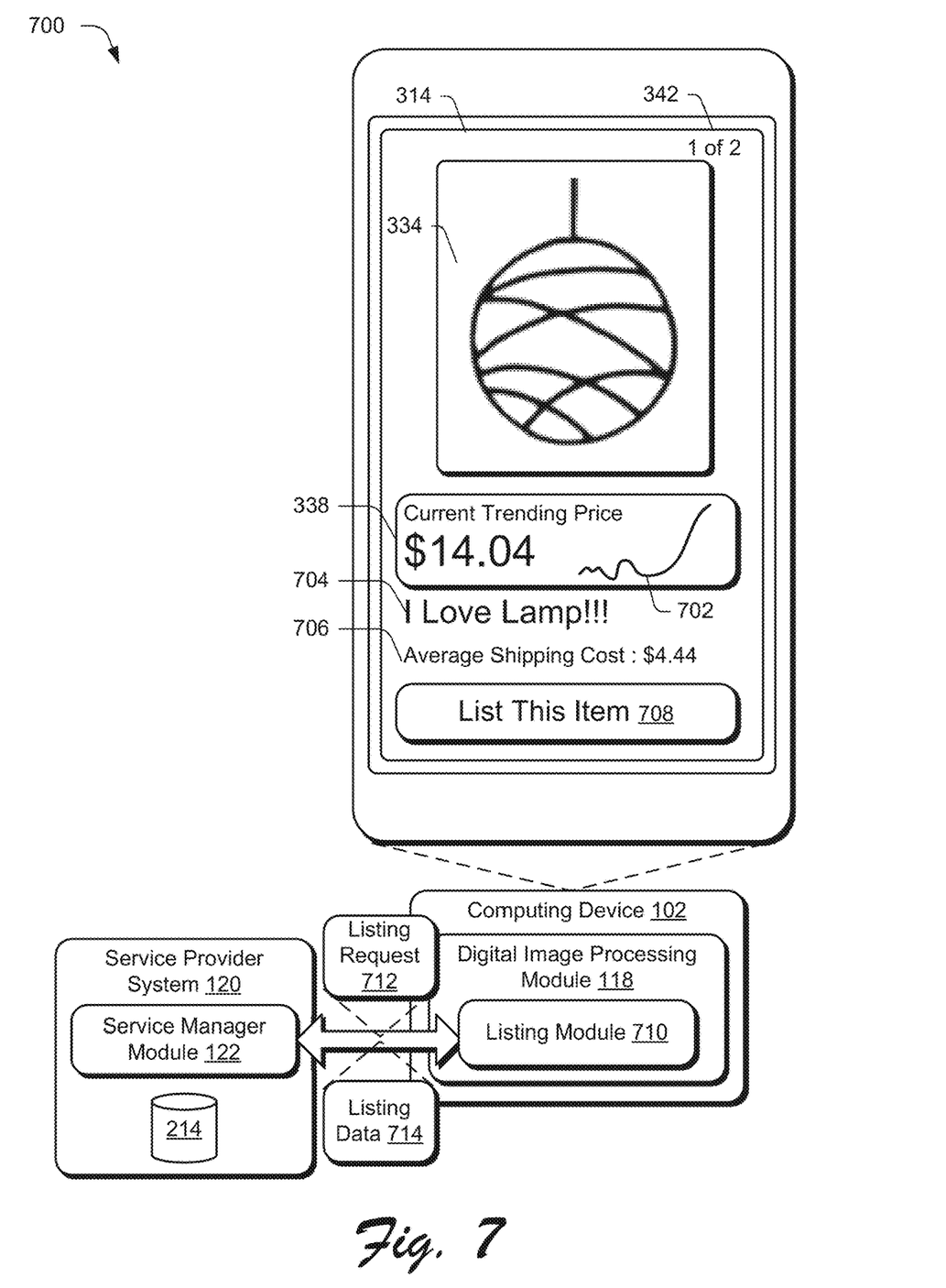
FIG. 7 depicts an example implementation of generation of a listing of a product captured as part of the virtual vault.
Figure 8:
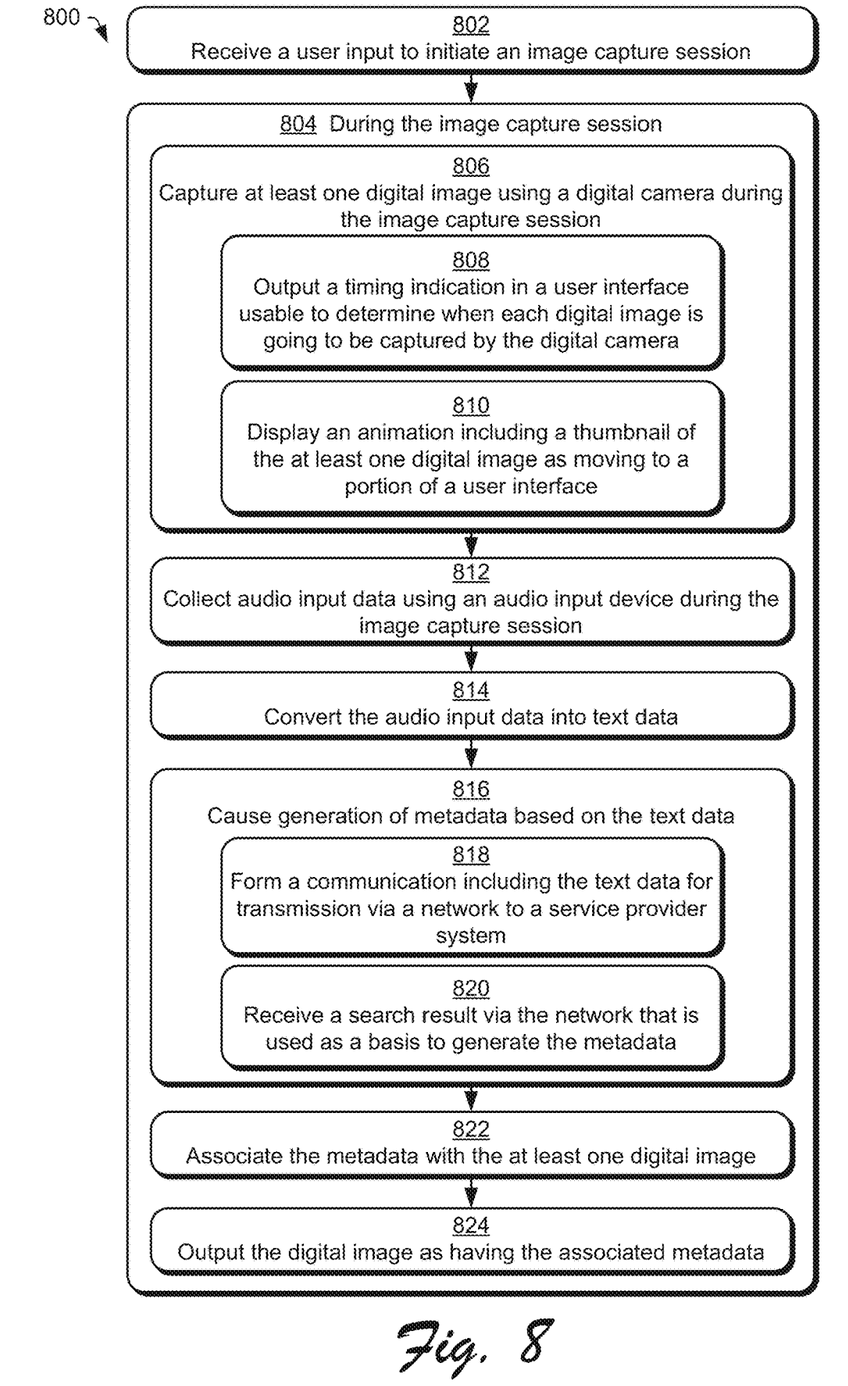
FIG. 8 is a flow diagram depicting a procedure in an example implementation of a digital image captures session and association of metadata.

FIG. 2 depicts a system 200 in an example implementation showing operation of the digital image processing module 118 of FIG. 1 in greater detail. FIGS. 3A and 3B depict examples of user interaction with the digital image processing module 118 as an image capture session as shown using first, second, third, fourth, fifth, and sixth stages 302-312. FIG. 4 depicts an example of the results of multiple digital image capture sessions. FIG. 5 depicts an example implementation of a virtual vault including results of multiple image capture sessions. FIG. 6 also depicts implementation of a virtual vault including results of multiple image capture sessions as including user definable collections. FIG. 7 depicts an example implementation of generation of a listing of a product captured as part of the virtual vault. FIG. 8 depicts a procedure 800 in an example implementation of a digital image captures session and association of metadata.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-8.

To begin, a user input is received to initiate an image capture session (block 802) and the image capture session is initiated in response by the digital image processing module 118 (block 804). As shown at the first stage 302, for instance, the computing device 102 renders a user interface 314 on the display device 124. The user interface 314 includes a user selectable option "start capture session" 316 to initiate the image capture session, e.g., detected using touchscreen functionality of the display device 124. This causes a digital image capture module 202 to cause the digital camera 108 to capture at least one digital image 110 during the image capture session (block 806).

As part of this, a timing indication is output in a user interface that is usable to determine when each digital image 110 is going to be captured by the digital camera 108 (block 808). As shown at the second stage 304, a border 318 and timing indication 320 are configured as concentric circles. These concentric circles, for instance, may correspond to a contact location made by a user to initiate and continue the image capture session. The user input, for instance, may be recognized as a gesture through a "press and hold" in which the press initiates the image capture session that, once released, causes the session to terminate.

The timing indication 320 is configured in this instance to successively expand towards the border 318 at a measured rate as shown through progression from the second stage 304 to the third stage 306 and the fourth stage 308. At the fourth stage 308, the timing indication 320 has reached the border. This causes the digital image processing module 118 to capture the digital image 110. The digital image processing module 118 also generates an animation including a thumbnail 322 of the captured digital image as moving to a portion of the user interface (block 810) as indicated by the dashed line. This process may continue to capture additional digital images 324, 326 through continued user input (e.g., maintaining the "press-and-hold" gesture) as illustrated at the fifth stage 310 within a single image capture session.

Returning again to FIG. 2, audio input data 114 is also captured during the image capture session by an audio input device 112 (block 812) and converted into text data 206 (block 814). The user 104, for instance, may indicate a brand name for the pitcher 132 of FIG. 3. The audio input data 114 is then provided to a speech-to-text recognition module 204 to generate text data 206 through use of a library 208. The audio input device 112, for instance, may include an analog-to-digital converter (ADC) to translate an analog wave signal into the audio input data 114. Phonemes in the audio input data 114 are then examined through use of the library 208 to generate the text data 206 by the speech-to-text recognition module 204.

The text data 206 is then provided to a metadata collection module 210 to generate the metadata 212 (block 814). In one example, the metadata 212 is generated locally, such as to tag the digital image 110. In another example, an external service system is employed. The metadata collection module 210, for instance, may form a communication that includes the text data 206 for transmission via a network to a service provider system 120 (block 818). The service provider system 120 employs a service manager module 122 to perform a search based at least in part on the text data 206. A search result is then received by the metadata collection module 210 via the network that is used as a basis to generate the metadata (block 820).

The service provider system 120 may be configured in a variety of ways and as a result so too can the metadata 212 vary in numerous ways. In one such example, the service provider system 120 and service manager module 122 are configured to support the sales of goods and services. As part of this, data is collected in the storage device 214 that describes the goods for sale (e.g., brand names), stock images, product descriptions, and prices. This information may then be used to generate metadata 212 that relate to content (e.g., a product or service) captured in the digital images 110.

The metadata 212 is then associated with the at least one digital image 114 (block 822) by a metadata association module 216. This may include inclusion of a tag as part of the image 114, as part of an associated data file, and so forth. A user interface rendering module 218 is then employed, such as to render the digital image 114 and associated metadata 116 for output by a display device 220 (block 824) and/or storage in a storage device 222, e.g., computer readable storage medium.

Returning again to FIG. 3B, at the sixth stage 312, a user input is received to cease the image capture session, e.g., a finger of the user's hand is lifted away from a touchscreen of the computing device 102. This causes the digital image processing module 118 to select one of the digital images 110 that are captured during the image capture session as a representative digital image 328 for the group of digital images 322-326. This selection may be based on a variety of factors, such as image characteristics to select the digital image 114 having the best relative image quality, e.g., as learned using machine learning. The group is then "collapsed" behind a single thumbnail representation as illustrated.

Metadata that is associated with the digital image 328 is also displayed concurrently in the user interface 314. In the illustrated instance, the metadata 332 includes a name of the product and an associated average sales price obtained from the service provider system 120. An indication 330 is also output of a number of digital images captured during the image capture session. In this way, a user may efficiently and intuitively obtain metadata describing the product through a combination of the digital image and the audio input.

FIG. 4 depicts an example system 400 in which the results of multiple image capture sessions are shown. In this example, the user 104 has continued to initiate image capture session to associate metadata regarding a variety of other objects in the living room 106. Illustrated examples of which include digital images of the lamp 334 and vase 336.

Each of these examples also include metadata 338, 340 having a product name and price (e.g., average price of multiple online auctions for the same or similar products) as well as indications 342, 344 of a number of digital images captured during respective image capture sessions. Thus, in this example a user may quickly interact with different objects and obtain information about those objects. In an implementation, this may also cover digital images captured of physical images (e.g., from a magazine, book) or as a screenshot, e.g., of a website, image from a social network system, etc. This combination of digital image and metadata may be used to support a variety of functionality, an example of which is described in the following and shown in a corresponding figure.

FIG. 5 depicts an example implementation 500 of a virtual vault having results of the image capture sessions. In this example, a user interface 314 is output by the computing device 102 that includes the digital images 328, 334, 336, metadata 332, 338, 340 and indications 330, 342, 344 as previously described. The user interface 314 also includes a current vault value 502 that is obtained from the metadata update module 504 from the service manager module 122.

The metadata update module 504, for instance, may obtain updates to the average prices following a push model in response to a change in the prices as determined by the service manager module 122, responsive to a call to an API by the metadata update module 504 upon access to the virtual vault, at predetermined intervals, and so forth. This may be reflected in the individual metadata 332, 338, 340 as well as the current vault value 502 for the group. Metadata 506, 508, 510 is also output indicating trends in the average prices, and thus may give users an indication of a good time to buy or sell a product.

Techniques may also be used to group results of image captures sessions. As shown in an example implementation 600 of FIG. 6, for instance, metadata describing an overall current vault value 602 is output along with metadata describing a collection of objects and associated image capture session, e.g., "Living Room Current Value $209.98" 604. In this way, a user may group and arrange results of image capture sessions as desired and have updates to metadata associated with the sessions in an efficient and organized manner. Each of the results is also user selectable in this example to navigate to a screen having additional information and functionality, an example of which is described in the following and shown in a corresponding figure.

FIG. 7 depicts a configuration of the user interface 314 results from user selection of the thumbnail 334 of the lamp in FIG. 6. This user interface 314 also includes the thumbnail 334 and indication 342 from the previous screen and metadata indicating the average price. In addition, the user interface 314 includes additional metadata formed as a graphical indication 702 of a price trend, a brand name 704 of the product, and average shipping costs 706 obtained from the service provider system 120.

The user interface 314 also includes an option to leverage the digital images and associated metadata of the image capture session, which in this example is to list an object subject of the image capture session for sale as "list this item" 708. Selection of this option in the user interface causes a listing module 710 of the digital image processing module 118 to generate a listing request 712 for listing data 714 pertinent to the object identified in the metadata 116, which was based on the audio input data 114. The listing data 714 includes product descriptions taken from other listing, shipping costs, stock images, and so on which may then be used "as is" or further modified to generate the listing. As a result, use the metadata and image capture session may increase awareness to a user regarding what is captured as part of the image capture session and further support efficient techniques to buy or sell products of the image capture sessions.

Although collection of commerce data is described in this example, image capture sessions described herein, and the metadata association techniques involved as part of these session, may be employed to support a variety of other functionality. In one example, the audio input data is employed to improve object recognition techniques used to identify objects in the digital images, e.g., to act as a "hint" to guide selection of models using machine learning. In another example, additional information is also collected to identify the objects, e.g., using radar techniques in which Wi-Fi signals are used to generate a 3D map of the object, which may then be used to guide a search of similar objects.

Example System and Device

Figure 9:
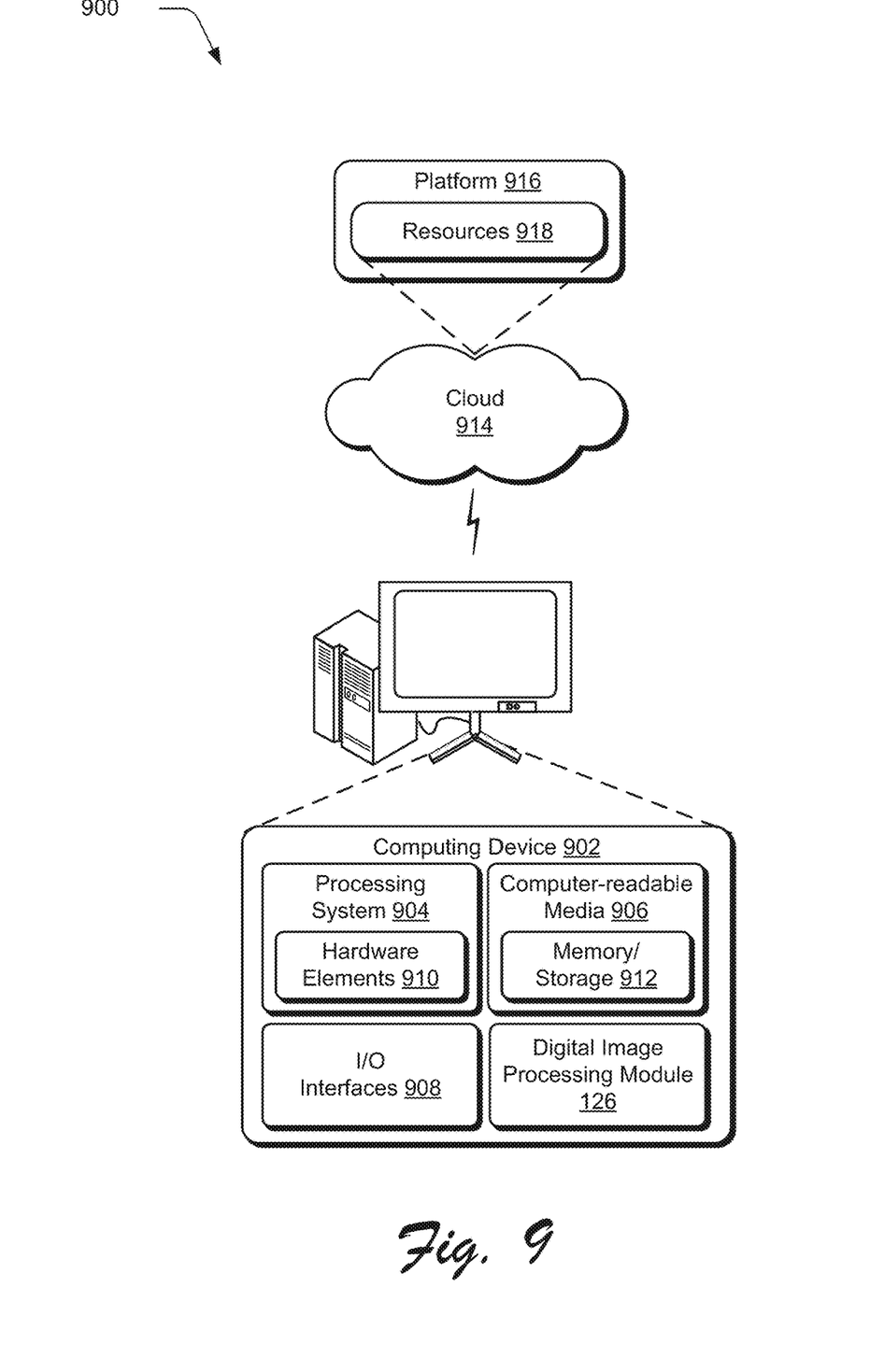
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the digital image processing module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   obtaining multiple digital images captured during an image capture session by a digital camera of a computing device;
   obtaining information relating to the multiple digital images captured during the image capture session;
   saving the multiple digital images captured during the image capture session and the information relating to the multiple digital images, wherein the information relating to the multiple digital images includes at least a product name of a product contained within at least one digital image of the multiple digital images captured during the image capture session and a price of the product, the price of the product based on an average price of similar products that are similar to the product and listed for sale on an online marketplace;
   monitoring to detect a change to the average price of the similar products listed for sale on the online marketplace;
   automatically updating the price of the product based on the change to the average price of similar products listed for sale on the online marketplace; and
   displaying, in a user interface presented at the computing device, the updated price of the product proximate a thumbnail image of at least one of the multiple digital images captured during the image capture session.

2. The method as described in claim 1, further comprising causing display of at least one additional thumbnail image of at least one additional product contained within at least one additional digital image of the multiple digital images captured during the image capture session along with a price of the at least one additional product.

3. The method as described in claim 2, wherein the price of the at least one additional product is based on an average price of similar products that are similar to the at least one additional product and listed for sale on the online marketplace.

4. The method as described in claim 3, further comprising computing an overall current value of the product and the at least one additional product based on the price of the product and the price of the at least one additional product, and displaying the overall current value in the user interface.

5. The method as described in claim 4, further comprising:
   monitoring to detect a change to the average price of the similar products listed for sale on the online marketplace; and
   automatically updating the price of the additional product based on the change to the average price of the similar products that are similar to the at least one additional product and listed on the online marketplace.

6. The method as described in claim 5, further comprising:
   updating the overall current value of the product and the at least one additional product based on the updated price of the additional product.

7. The method as described in claim 1, further comprising causing display of a control in a user interface presented at the computing device that is selectable to list the product on the online marketplace.

8. The method as described in claim 7, wherein the control is selectable to list the product for sale on the online marketplace.

9. A system comprising:
   at least a memory and a processor to perform operations comprising:
      obtaining multiple digital images captured during an image capture session by a digital camera of a computing device;
      obtaining information relating to the multiple digital images captured during the image capture session;
      saving the multiple digital images captured during the image capture session and the information relating to the multiple digital images, wherein the information relating to the multiple digital images includes at least a product name of a product contained within at least one digital image of the multiple digital images captured during the image capture session and a price of the product, the price of the product based on an average price of similar products that are similar to the product and listed for sale on an online marketplace;
      monitoring to detect a change to the average price of the similar products listed for sale on the online marketplace;
      automatically updating the price of the product based on the change to the average price of similar products listed for sale on the online marketplace; and
      displaying, in a user interface presented at the computing device, the updated price of the product proximate a thumbnail image of at least one of the multiple digital images captured during the image capture session.

10. The system as described in claim 9, wherein the operations further comprise causing display of at least one additional thumbnail image of at least one additional product contained within at least one additional digital image of the multiple digital images captured during the image capture session along with a price of the at least one additional product.

11. The system as described in claim 10, wherein the price of the at least one additional product is based on an average price of similar products that are similar to the at least one additional product and listed for sale on the online marketplace.

12. The system as described in claim 11, wherein the operations further comprise computing an overall current value of the product and the at least one additional product based on the price of the product and the price of the at least one additional product, and displaying the overall current value in the user interface.

13. The system as described in claim 12, wherein the operations further comprise:
   monitoring to detect a change to the average price of the similar products listed for sale on the online marketplace; and
   automatically updating the price of the additional product based on the change to the average price of the similar products that are similar to the at least one additional product and listed on the online marketplace.

14. The system as described in claim 13, wherein the operations further comprise updating the overall current value of the product and the at least one additional product based on the updated price of the additional product.

15. One or more computer-readable storage devices comprising instructions stored thereon that, responsive to execution by one or more processors, perform operations comprising:
 obtaining multiple digital images captured during an image capture session by a digital camera of a computing device;
 obtaining information relating to the multiple digital images captured during the image capture session;
 saving the multiple digital images captured during the image capture session and the information relating to the multiple digital images, wherein the information relating to the multiple digital images includes at least a product name of a product contained within at least one digital image of the multiple digital images captured during the image capture session and a price of the product, the price of the product based on an average price of similar products that are similar to the product and listed for sale on an online marketplace;
 monitoring to detect a change to the average price of the similar products listed for sale on the online marketplace;
 automatically updating the price of the product based on the change to the average price of similar products listed for sale on the online marketplace; and
 displaying, in a user interface presented at the computing device, the updated price of the product proximate a thumbnail image of at least one of the multiple digital images captured during the image capture session.

16. The one or more computer-readable storage devices as described in claim 15, wherein the operations further comprise causing display of at least one additional thumbnail image of at least one additional product contained within at least one additional digital image of the multiple digital images captured during the image capture session along with a price of the at least one additional product.

17. The one or more computer-readable storage devices as described in claim 16, wherein the price of the at least one additional product is based on an average price of similar products that are similar to the at least one additional product and listed for sale on the online marketplace.

18. The one or more computer-readable storage devices as described in claim 17, wherein the operations further comprise computing an overall current value of the product and the at least one additional product based on the price of the product and the price of the at least one additional product, and displaying the overall current value in the user interface.

19. The one or more computer-readable storage devices as described in claim 18, wherein the operations further comprise:
 monitoring to detect a change to the average price of the similar products listed for sale on the online marketplace; and
 automatically updating the price of the additional product based on the change to the average price of the similar products that are similar to the at least one additional product and listed on the online marketplace.

20. The one or more computer-readable storage devices as described in claim 19, wherein the operations further comprise updating the overall current value of the product and the at least one additional product based on the updated price of the additional product.

* * * * *